May 6, 1969  J. F. BROOS  3,442,464
FILM SPOOL
Filed Feb. 17, 1967

INVENTOR
Jozef Frans Broos
BY Watson, Cole, Grindle and Watson
ATTORNEY

United States Patent Office 3,442,464
Patented May 6, 1969

3,442,464
FILM SPOOL
Jozef Frans Broos, Hove, Belgium, assignor to Gevaert-Agfa N.V., Mortsel, Belgium, a Belgian company
Filed Feb. 17, 1967, Ser. No. 616,860
Claims priority, application Great Britain, Feb. 17, 1966, 7,094/66
Int. Cl. B65h 75/18
U.S. Cl. 242—71.8       3 Claims

ABSTRACT OF THE DISCLOSURE

A film spool having a barrel and two flanges, each flange carrying a sleeve telescoped on corresponding sleeves on the barrel. A bead and recess on the corresponding sleeves engage each other. Slots on the barrel sleeve allow said sleeve to yield during assembly and keying with a projection on the flange sleeve.

---

The invention relates to film spools with a cylindrical core and a pair of terminal dished flanges.

Spools of the described configuration are known, comprising metal dished flanges welded to a metal core, or press-fitted to a wood or a metal core.

Film spools made from synthetic material, especially from thermoplastic synthetic material by injection moulding, are also known, but only spools having flat flanges have been formed by moulding because of the complicated molds required for moulding spools with dished flanges.

According to the present invention a film spool injection moulded from plastic materials, comprising a core and a pair of terminal dished flanges is composed of at least two parts, two parts of said at least two parts comprising each a dished flange and a portion for engaging a portion at the corresponding other part so as to rigidly secure the parts together.

Preferably the parts are shaped for snap-fitting together.

The expression "dished flange" is intended to cover any flange shaping such that the flange peripheries extend inwardly with respect to the inner faces of radially inward portions of the flanges extending up to the core or extending over a part of the distance up to such core. Thus, outer peripheral portions of the flanges may have their inner faces spaced to a lesser extent than the remaining portions of the flanges, or near the core the spacing between the inner faces of the flanges may again decrease. Preferably the flanges are shaped so that their inner faces or the inner faces of their outer marginal portions curve inwardly.

Preferably the film spool comprises three parts, viz., a cylindrical core part and two dished flange parts. The core may be shaped at each extremity with a plug portion for snap engaging an end socket provided on one of the flange parts.

The molding of the parts comprising the dished flanges is quite simple, since the mould parts can be moved apart in the direction of the spool axis. In other words, the mould components for moulding each flange part can be shaped so that they define opposite faces of a flange.

In case the spool comprises three parts as mentioned hereinbefore, vis., a cylindrical spool body or core and two flange parts, a film may if desired be wound onto the core by the manufacturer, before the flanges are fitted to such core.

The invention is particularly intended in connection with film spools for photographic roll film wound on spools for daylight loading of cameras and backed by and interwound with an opaque backing.

An embodiment of the invention will now be described, by way of example, with reference to the accompanying drawings in which.

Figure 1:
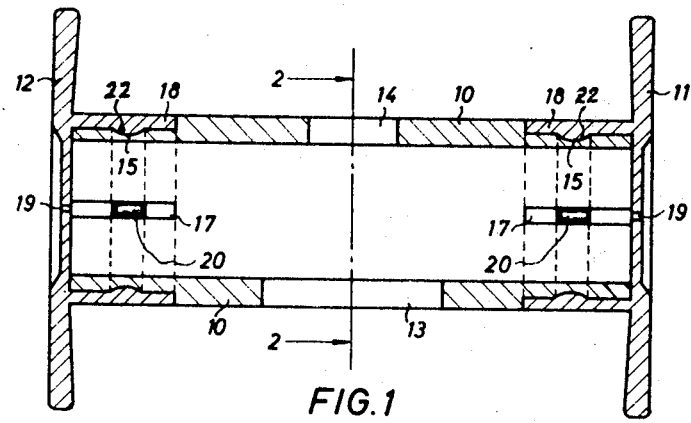
FIG. 1 is a longitudinal section through a film spool according to the invention.
Figure 2:
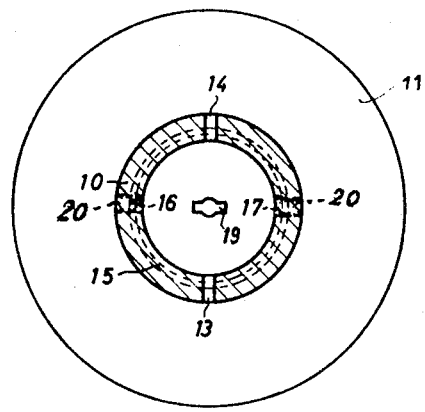
FIG. 2 is a section of the core on line 2—2 of FIG. 1.

FIG. 1 shows a spool for roll film, made from extruded synthetic material, such as polystyrene, and comprises a tubular core 10 and two terminal dished flanges 11 and 12. The core is provided with slots 13, 14 for introducing the tapered trailing end of the backing paper.

At each extremity, the core 10 is provided with a portion of reduced outer diameter wherein an annular recess 15 is provided. Further there are provided the slots 16 and 17 which permit the said extremities to yield to a given extent when they are inserted into the flange parts.

The flange parts 11 and 12 consist of a dished portion and a tubular portion 18. The tubular portion 18 is provided with an interior annular bead 22 which snap engages the annular recess 15 of the core 10. The flange parts 11 and 12 further have a central slot 19 for engaging a spool driving or locating key which may be carried by the camera structure, and the tubular portion 18 has a rectangular projection 20 which slides in the slots 17 of the core 10 and which secures thereby the flange against rotation in respect of the core.

For winding up a roll film onto the spool, the tapered end of the film or backing paper is inserted in the slots 13 and 14, and the spool is rotated. The inwardly curved flange edges guide the film and the backing paper so that a smooth rolling is obtained. They further secure the film roll to a given extent against unrolling when the seal of the film roll is broken by the user before introducing the film spool into the camera. The use of backing paper with appropriate width prevents edge fogging of the film.

The invention is not limited to a spool of the described configuration. The spool may be composed of two instead of three parts, each of said two parts comprising a dished flange, a core portion, and means for engaging the other part.

The connection of the different parts of the spool to each other may occur in other ways than according to the described annular projection and recess connection. Thus the extremities of the core may be shaped slightly conically and the tubular portions of the flanges can be introduced by exerting external force thereon so that a tight fit exists between the flange parts and the core. Consequently the invention includes, by way of modification of the invention as hereinbefore defined, any said spool wherein the molded parts are shaped for press-fitting together without interlock.

The interior faces of the dished flanges may have other forms than the one shown. Thus, for example, said interior faces may be stepped or they may each have a retracting profile near the core so that the width between the flanges measured near the core and near their peripheries is substantially equal.

The connection of the tapered end of the film or of the backing paper to the core may if desired be achieved with the aid of spring means located in the slotlike core opening or by means of a pressure-sensitive strip.

At least the central portion of the core may be solid instead of hollow, to afford a better guidance for the tapered end of the film or the backing paper. Alternatively internal projections or notches may be provided in the core for smoothly guiding the tapered end from slot 13 to slot 14.

When the spool is used in connection with automatic or semiautomatic spooling machines of appropriate design, the film roll may occasionally be wound up onto the core before the flanges are fitted. When the rolling has been completed and the film has been secured against unrolling, the flanges may be fitted to the core automatically.

When roll films must be produced which differ only from each other in respect of the dimensions or the shape of the slots for engaging the spool driving or locating keys, it may be interesting to wind the roll films onto one type of core, and to fit to said core flange parts having different types of slots according to the type of roll film wanted. Examples of such spools are, e.g., the well-known roll films of the type 120 for thick camera pins, and the type 620 for thin pins.

What I claim is:

1. A film spool injection molded from plastic material and comprised of a barrel and a pair of dished terminal flanges, each of said flanges and each end of said barrel having a sleeve portion thereon, the sleeve portion of each flange fitting in telescoping relation with the sleeve portion of one barrel end, one of said telescoping sleeve portions including a circumferential bead at a circumference thereon axially spaced from its end and the other a circumferential recess spaced correspondingly from its end for mating engagement by said bead, the diameter of said bead measured at its apex being substantially the same as the diameter of said recess measured at its bottom, one of said telescoping sleeve portions also including a plurality of radially opening slots extending substantially the length thereof overlapped by said other sleeve, said slots permitting the sleeve portion bearing the same to temporarily change diameter so that the sleeve portions can be telescoped together by sliding one within the other, said other sleeve including a radially directed integral projection keyed into one of said slots and preventing relative rotation of the flanges and barrel.

2. A film spool according to claim 1, which is at either extremity provided with end portions adapted to be engaged by spool driving or locating members.

3. A film spool according to claim 1, wherein the core part is provided with a slotted core for receiving a tapered end of a film.

References Cited

UNITED STATES PATENTS

| 200,706 | 2/1878 | Fay | 242—118.61 |
| 1,469,018 | 9/1923 | Kingsbury | 242—71.8 |
| 2,400,024 | 5/1946 | Roehrl | 242—71.8 |

FOREIGN PATENTS 703,741  2/1954  Great Britain.

NATHAN L. MINTZ, *Primary Examiner.*